United States Patent
Fritz

(10) Patent No.: US 6,360,393 B1
(45) Date of Patent: Mar. 26, 2002

(54) METHOD FOR CONVERTING A DOCK LEVELER TO A DOCK LEVELER OPERATED WITH AN INFLATABLE MEMBER AND A DOCK LEVELER PRODUCED BY THE SAME

(75) Inventor: Ben Fritz, Milwaukee, WI (US)

(73) Assignee: Kelley Company, Inc., Mequon, WI (US)

( * ) Notice: Subject to any disclaimer, the term of this patent is extended or adjusted under 35 U.S.C. 154(b) by 0 days.

(21) Appl. No.: 09/661,826

(22) Filed: Sep. 14, 2000

(51) Int. Cl.⁷ ................................................ E01D 1/00
(52) U.S. Cl. ........................ 14/69.5; 14/71.3; 14/71.7
(58) Field of Search ............................... 14/69.5, 71.3, 14/71.7; 414/401

(56) References Cited

U.S. PATENT DOCUMENTS

| | | | |
|---|---|---|---|
| 4,097,949 A | * 7/1978 | Barrett | 14/71.3 |
| 5,088,143 A | * 2/1992 | Alexander | 14/69.5 |
| 5,446,938 A | 9/1995 | Warner et al. | |
| 5,471,693 A | 12/1995 | Hodges | |
| 5,475,888 A | 12/1995 | Massey | |
| 5,481,774 A | 1/1996 | Hodges et al. | |
| 5,500,968 A | 3/1996 | Hodges | |
| 5,522,107 A | 6/1996 | Hageman et al. | |
| 5,522,108 A | 6/1996 | Massey et al. | |
| 5,600,859 A | 2/1997 | Hodges et al. | |
| 5,651,155 A | 7/1997 | Hodges et al. | |
| 5,802,650 A | 9/1998 | Massey et al. | |
| 5,802,651 A | 9/1998 | Massey et al. | |
| 5,832,554 A | 11/1998 | Alexander | |

OTHER PUBLICATIONS

Kelley Company Inc. Docklevelers product brochure 1992, p. 7.
Kelley Company Inc. K Series Kelley Mechanical Dockleveler product brochure 1994.
Kelley Company Inc. K Series Kelley Hydraulic Dockleveler product brochure, 1994.
Kelley Company Inc. EHD Series Kelley Dyna–Load Extra Heavy–Duty Hydraulic Dockleveler product brochure, 1992.
Kelley Company Inc. FX Dockleveler product brochure 1995, pp. 4 and 5.
Kelley Company Inc. W Series Kelley Dyna–Load Hydraulic Dockleveler product brochure, 1989.

* cited by examiner

Primary Examiner—Steven A. Bratlie
(74) Attorney, Agent, or Firm—Michael Best & Friedrich LLP

(57) ABSTRACT

A method and conversion kit for converting a non-inflatable dock leveler having a lifting mechanism to an inflatable bag dock leveler. The method includes removing the lifting mechanism from the non-inflatable dock leveler and coupling an inflatable lifting assembly to the non-inflatable dock leveler. Removing the lifting mechanism preferably includes removing the spring of a mechanical dock leveler or removing the hydraulic cylinder of a hydraulic dock leveler. The method preferably also includes connecting first and second support members to the non-inflatable dock leveler to support the inflatable lifting assembly. The conversion kit includes an inflatable lifting assembly and a first support member for supporting a first portion of the inflatable lifting assembly. Further preferably, the conversion kit includes a second support member for supporting a second portion of the inflatable lifting assembly.

32 Claims, 10 Drawing Sheets

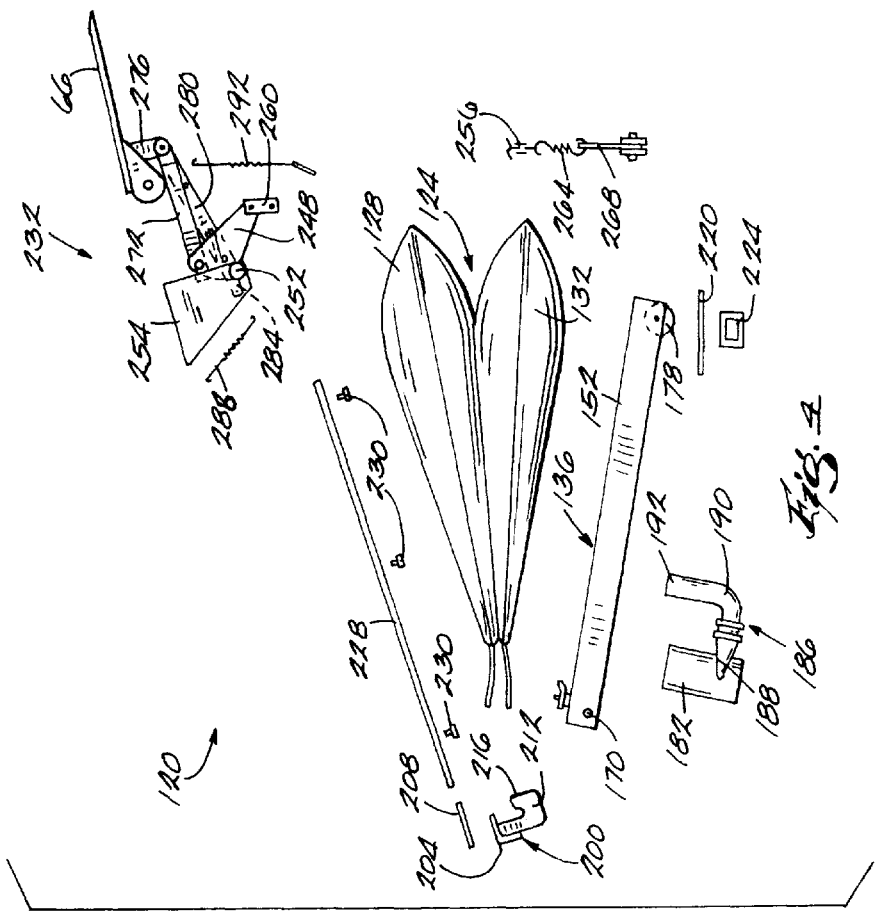
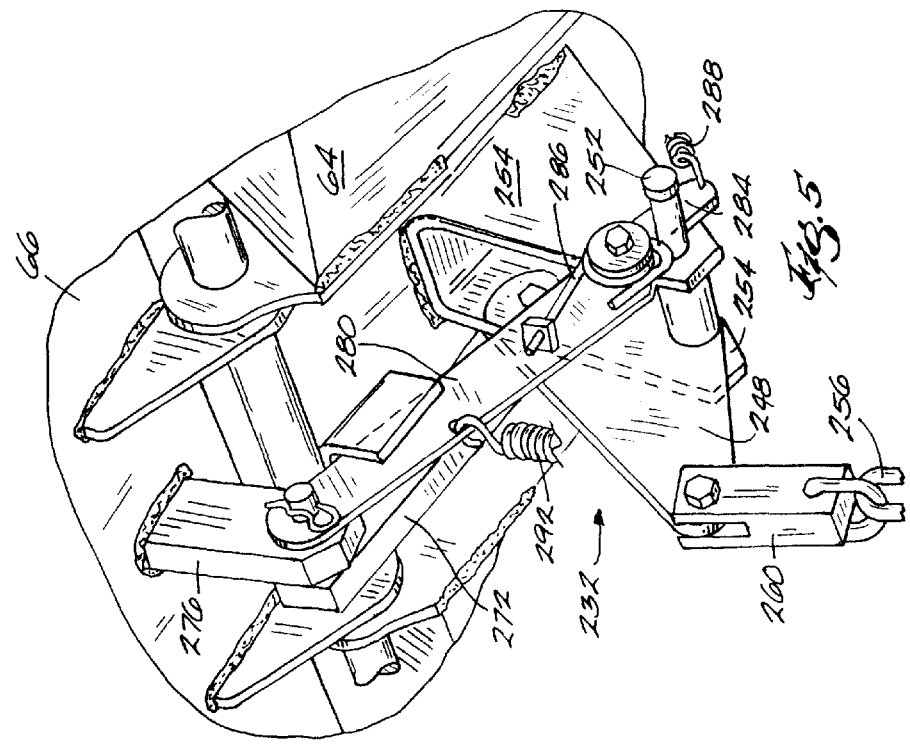

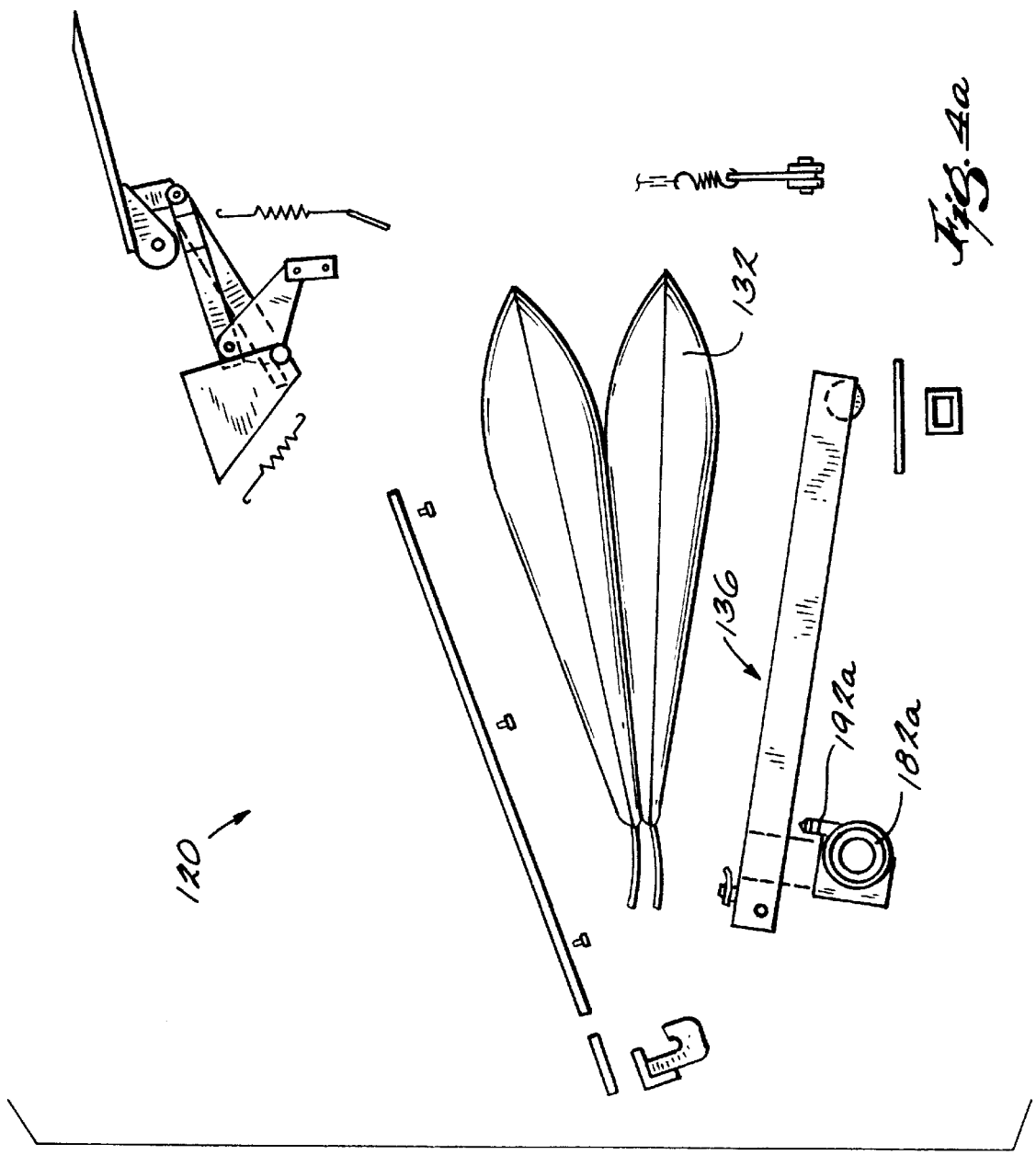

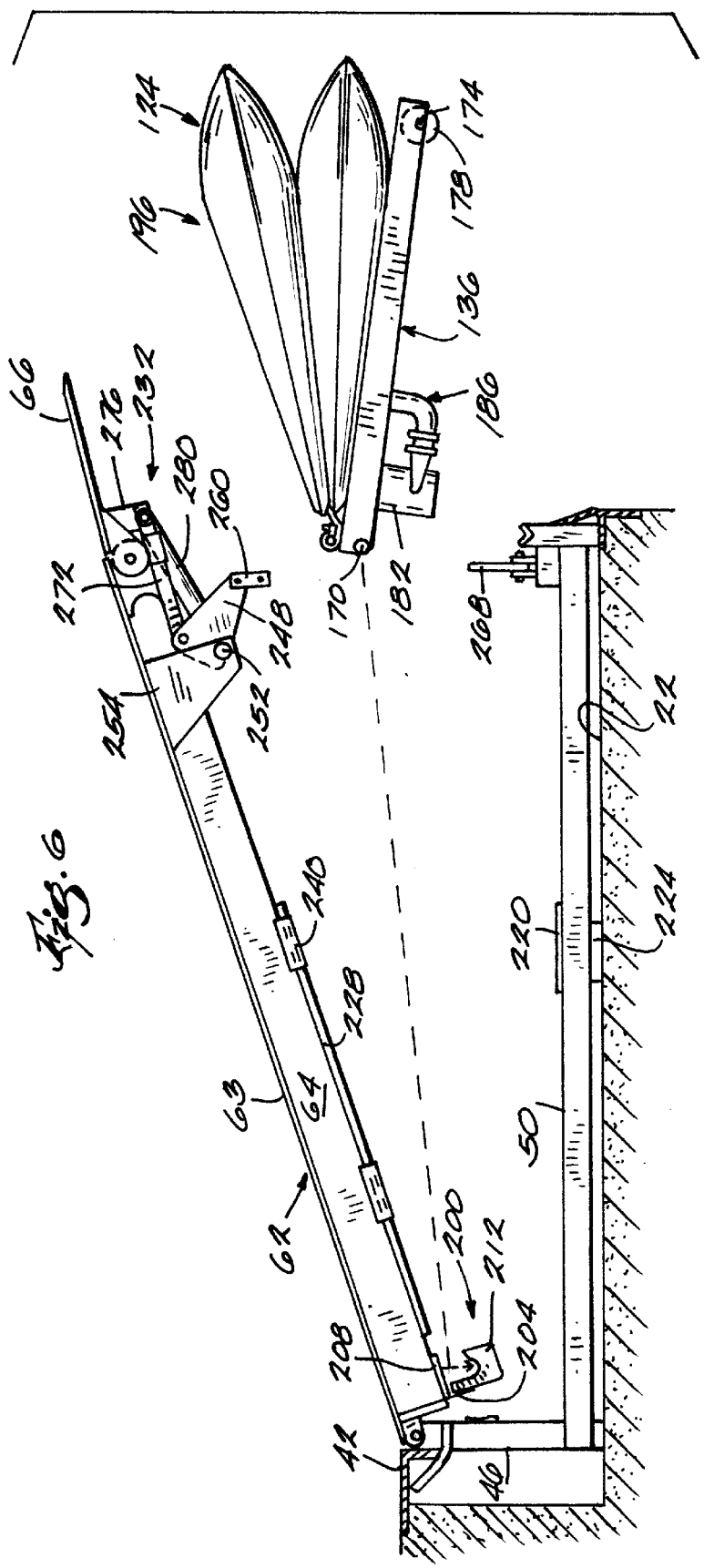

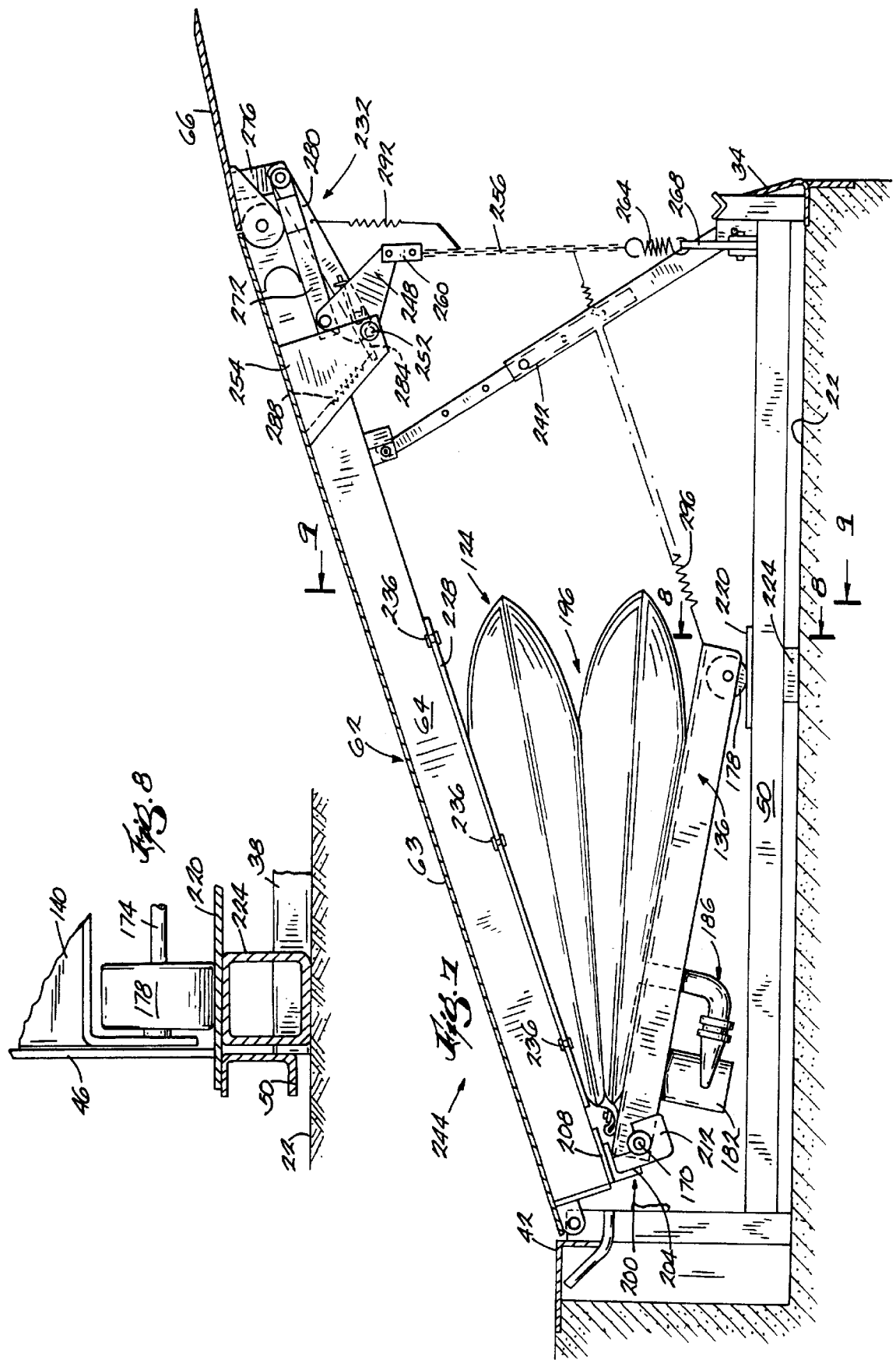

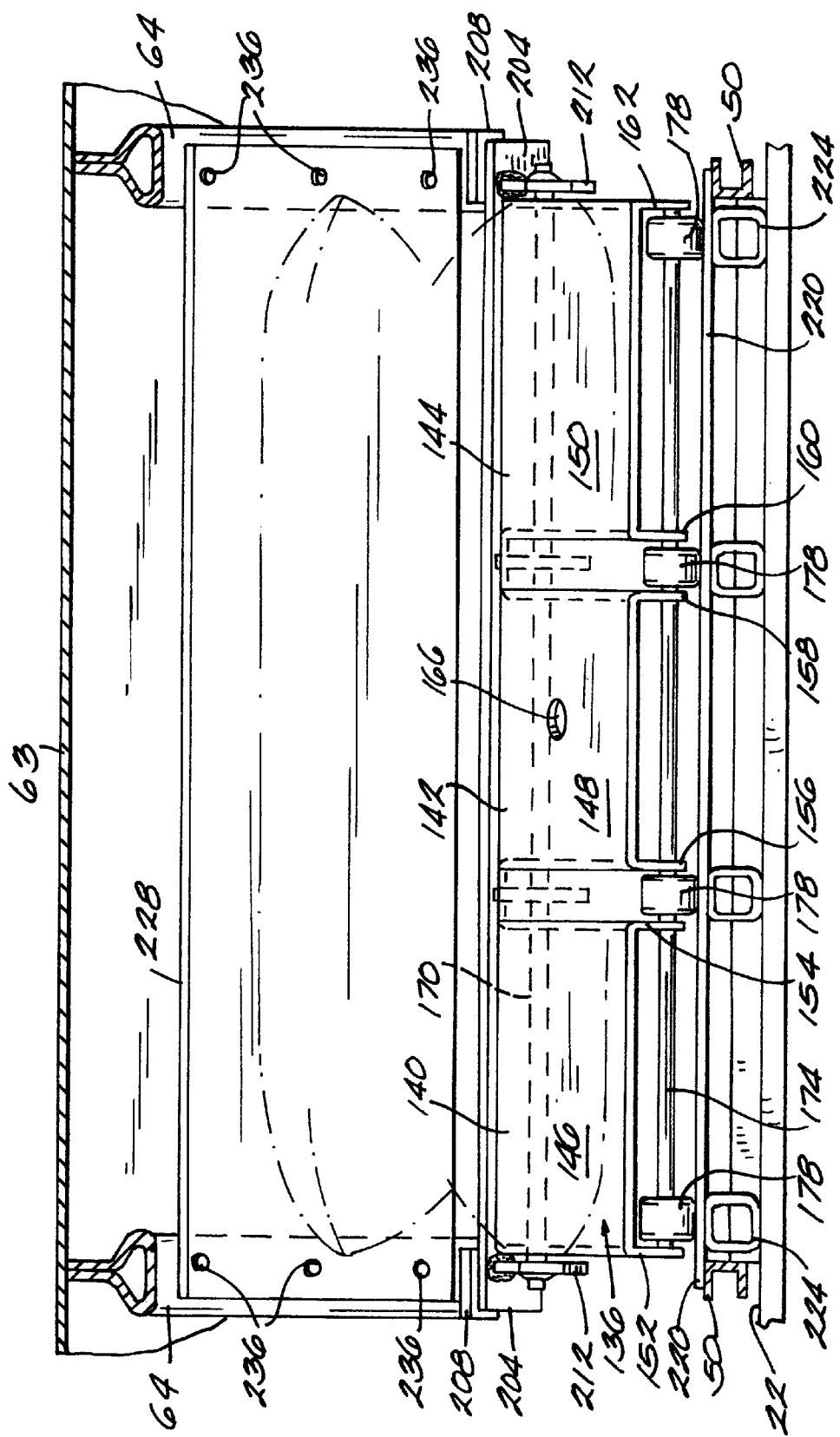

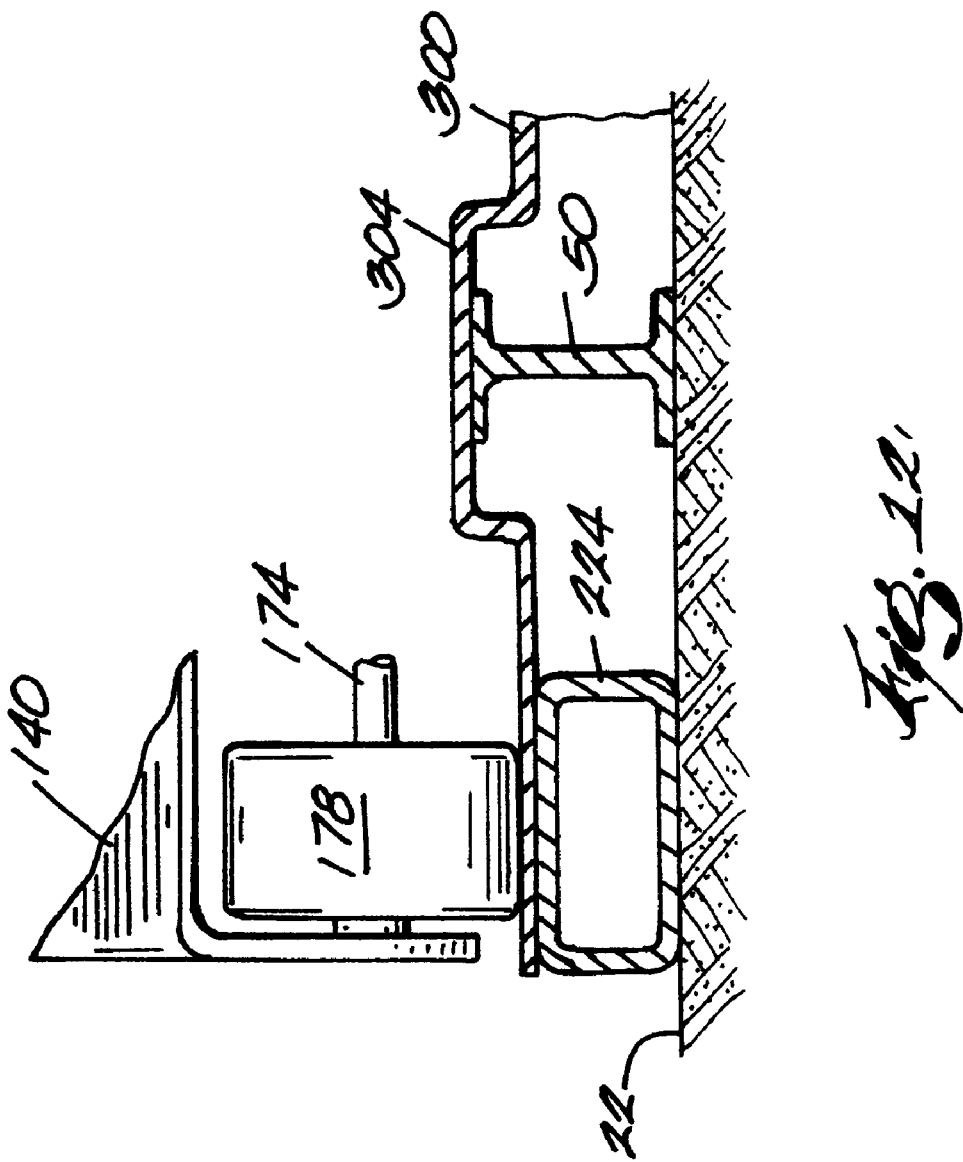

METHOD FOR CONVERTING A DOCK LEVELER TO A DOCK LEVELER OPERATED WITH AN INFLATABLE MEMBER AND A DOCK LEVELER PRODUCED BY THE SAME

FIELD OF THE INVENTION

The invention relates to dock levelers used to bridge the gap between a loading dock and a vehicle (e.g. the bed of a truck or trailer) parked adjacent the loading dock, and more particularly to the maintenance, refurbishment, and upgrading of mechanical or hydraulic dock levelers.

BACKGROUND OF THE INVENTION

Dock levelers are designed and built to provide years of reliable service with minimal periodic maintenance. The proper maintenance of the dock levelers depends on the type of dock leveler being used.

A mechanical dock leveler incorporates a large main spring or a multiple spring assembly to counterbalance the ramp or deck plate during movement between various positions. Mechanical dock levelers are typically operated manually using a pull chain and the weight of the operator as is commonly understood. Mechanical dock levelers will usually operate indefinitely with maintenance performed on the moving parts and with occasional replacement of the main spring or the multiple spring assembly. Replacing the springs is relatively expensive, but is cheaper than buying a whole new dock leveler.

A hydraulic dock leveler incorporates one or more hydraulic cylinders to move the ramp or deck plate between the various operating positions. Hydraulic dock levelers are less cumbersome to operate than mechanical dock levelers, but require more maintenance due to the use of the hydraulic cylinders, pumps and motors. The hydraulic fluid must be refilled and/or changed periodically, and the hydraulic cylinder must be replaced periodically. Replacing the hydraulic cylinders is relatively expensive, but is cheaper than buying a whole new dock leveler.

Mechanical and hydraulic dock levelers are the most common types of dock levelers in use today. But recent developments in the dock leveler art disclose a dock leveler using an inflatable member or bag to pivot the ramp (hereinafter referred to as an inflatable bag dock leveler). U.S. Pat. No. 5,802,650 discloses a dock leveler having a bag inflatable with low pressure air by an inflating device such as a fan or blower, and is hereby incorporated by reference in its entirety. Inflatable bag dock levelers have proven to be reliable alternatives to mechanical and hydraulic dock levelers, and the volume of new unit sales is rapidly increasing.

SUMMARY OF THE INVENTION

While the sale of new inflatable bag dock levelers is rapidly increasing, it is well-known that there are many more mechanical and hydraulic dock levelers already in operation around the world. It would be desirable to some people to upgrade from a mechanical or hydraulic dock leveler to a new, easy to operate, automatic, and environmentally-friendly inflatable bag dock leveler, but the expense of replacing an entire dock leveler is high, and therefore prohibitive. Even if the springs of mechanical dock leveler or the hydraulic cylinders, the pump, and the motor of a hydraulic dock leveler need to be replaced, it is usually less expensive to replace those parts than to buy a whole new dock leveler.

It would therefore be desirable to provide a cost effective method for upgrading a mechanical or hydraulic dock leveler to an inflatable dock leveler. The present invention provides a method for converting existing mechanical and hydraulic dock levelers to inflatable bag dock levelers, wherein the existing subframe, ramp, and extension lip are used. By converting existing dock levelers, instead of completely replacing them, the method and apparatus of the present invention provides a less expensive way to upgrade to an inflatable bag dock leveler.

More specifically, the invention provides a method of converting a non-inflatable dock leveler having a lifting mechanism to an inflatable bag dock leveler. The method includes removing the lifting mechanism from the non-inflatable dock leveler and coupling an inflatable lifting assembly to the dock leveler. Removing the lifting mechanism preferably includes removing the spring or the spring assembly of a mechanical dock leveler, or removing the hydraulic cylinder or cylinders, the pump, and the motor of a hydraulic dock leveler. The method preferably also includes connecting first and second support members to the non-inflatable dock leveler to support the inflatable lifting assembly.

In another aspect, the invention provides a dock leveler conversion kit. The conversion kit includes an inflatable lifting assembly and a first support member for supporting a first portion of the inflatable lifting assembly when the first support member and the inflatable lifting assembly are coupled to a dock leveler after the old lifting mechanism has been removed. Preferably, the conversion kit also includes a second support member for supporting a second portion of the inflatable lifting assembly.

Other features and advantages of the invention will become apparent to those skilled in the art upon review of the following detailed description, claims, and drawings.

BRIEF DESCRIPTION OF THE DRAWINGS

FIG. 4 is an exploded side view of a dock leveler conversion kit embodying the present invention.

FIG. 4a is an exploded side view of a dock leveler conversion kit having an alternative fan device.

FIG. 5 is a perspective view of the lip extension mechanism of FIG. 4.

FIG. 6 is a side view showing the dock leveler conversion kit of FIG. 4 partially installed on the dock leveler of FIG. 3.

FIG. 7 is a side view showing the dock leveler conversion kit of FIG. 4 completely installed on the dock leveler of FIG. 3.

FIG. 8 is a partial section view taken along line 8—8 in FIG. 7.

FIG. 9 is a partial section view taken along line 9—9 in FIG. 7, with some parts removed for ease of illustration.

FIG. 12 is a partial section view similar to FIG. 8 showing an alternative configuration for a roller support member.

Figure 1:
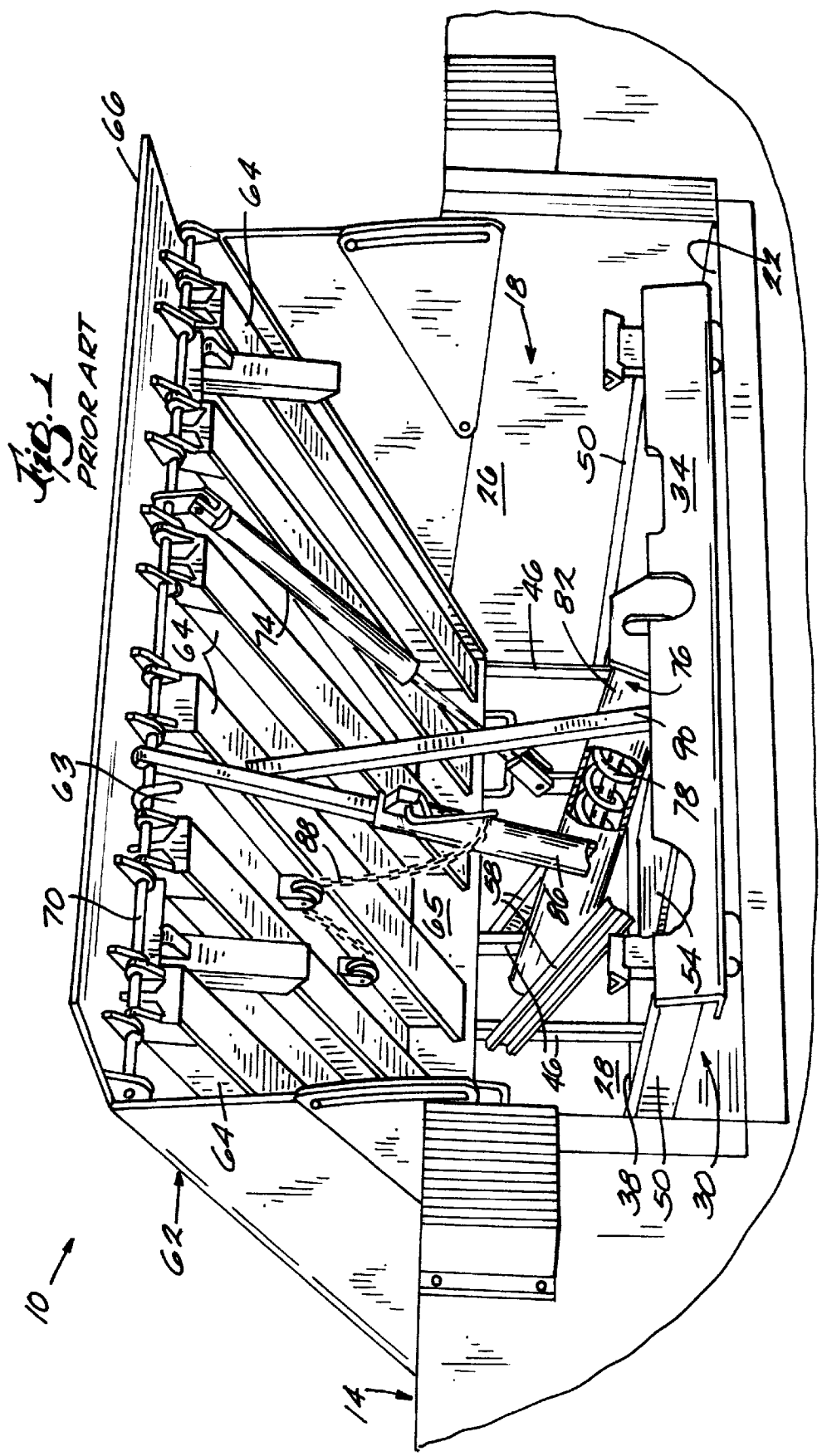
FIG. 1 is a perspective view of a prior art mechanical dock leveler.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

The mechanical dock leveler 10 of FIG. 1 is representative of numerous prior art mechanical dock levelers, and it should be understood that the present invention is not limited to being used in conjunction with the specific mechanical dock leveler 10 illustrated in FIG. 1. The dock leveler 10 is shown mounted at a loading dock 14 having a pit 18 defining a pit floor 22, sidewalls 26 (only one is shown in FIG. 1), and a rear wall 28. The dock leveler 10 is adapted to bridge the gap between the upper surface of the loading dock 14 and a vehicle (not shown) parked in front of the loading dock 14, to facilitate loading or unloading of the vehicle.

The illustrated dock leveler 10 includes a frame or supporting structure 30 that is mounted in the pit 18. The frame 30 typically includes front and rear lower members 34 and 38, respectively, an upper member 42 (see FIGS. 6 and 7), spaced-apart substantially vertical members 46 connected between the upper member 42 and the rear lower member 38, and spaced-apart side members 50 connected between the front member 34 and the outer-most vertical members 46. The frame 30 also typically includes a base plate 54 that extends forwardly from the rear lower member 38 and rests at least partially on the pit floor 22. Angled support members 58 are connected between the base plate 54 and the inner-most vertical members 46. Additionally and/or alternatively, the angled support members 58 can be connected between the base plate 54 and the outer-most vertical members 46, the base plate 54 and the side members 50, or both.

The dock leveler 10 also includes a ramp 62 pivotally mounted to the rear of the frame 30 via one or more pins in a conventional manner. The ramp 62 includes a deck plate 63 mounted on longitudinally-extending beams 64 that extend from a rear member 65. The ramp 62 is movable between a generally horizontal stored, dock-level position, in which the deck plate 63 is flush and substantially co-planar with the upper surface of dock 14, an upwardly inclined position, as shown in FIG. 1, and a below dock-level position, in which the deck plate 63 is declined from the upper surface of the dock 14 toward the pit floor 22. An extension lip 66 is hinged to the forward end of the ramp 62 by means of at least one hinge pin 70. The extension lip 66 is pivotable from a downwardly hanging pendant position (not shown), to an outwardly extending position as illustrated in FIG. 1, via a conventional lip extension mechanism 74, which is actuated when the ramp 62 is moved between a lowered position to its raised position. The lip extension mechanism 74 can be any suitable mechanical, hydraulic, or pneumatic mechanism, as is known in the art (shown as a mechanical lip extension mechanism in FIG. 1). When the lip 66 is moved to its outwardly extending position, the lip 66 is substantially co-planar with the ramp 62, forming an extension to the ramp 62.

The dock leveler 10 also includes a lifting subassembly or mechanism 76 located in the pit 18 beneath the ramp 62. The lifting mechanism 76 for the dock leveler 10 of FIG. 1 is a mechanical lifting mechanism having a single counterbalance extension spring 78 that biases the ramp 62 to the raised position as is commonly known. The spring 78 is shown positioned inside a cylindrical enclosure 82 that extends from the inner-most vertical members 46 to the front lower member 34, between the angled support members 58, and over a portion of the base plate 54. The dock leveler 10 also includes a hold-down mechanism 86 that can hold the ramp 62 in any of a plurality of positions. The hold-down mechanism 86 is also of a known construction. By pulling on a pull chain 88, the dock operator releases the hold-down mechanism 86 and the ramp 62 rises. The operator then walks onto the ramp 62 to lower the ramp 62 until the lip 66 engages the vehicle. The hold-down mechanism 86 will hold the ramp 62 in that position, while allowing for a small amount of movement of the vehicle.

It should be noted that other configurations of mechanical lifting mechanisms are also well-known and could be used on the dock leveler 10 in place of the lifting mechanism 76. For example, the lifting mechanism could include a spring assembly having a plurality of springs coupled to a lifting linkage as is known. It should also be noted that other configurations of mechanical hold-down mechanisms are also well-known and could be used on the dock leveler 10 in place of the illustrated hold-down mechanism 86. Also shown in FIG. 1 is a maintenance strut 90 that can support the ramp 62 in the raised position for maintenance of the dock leveler 10 and the pit 18.

Figure 2:
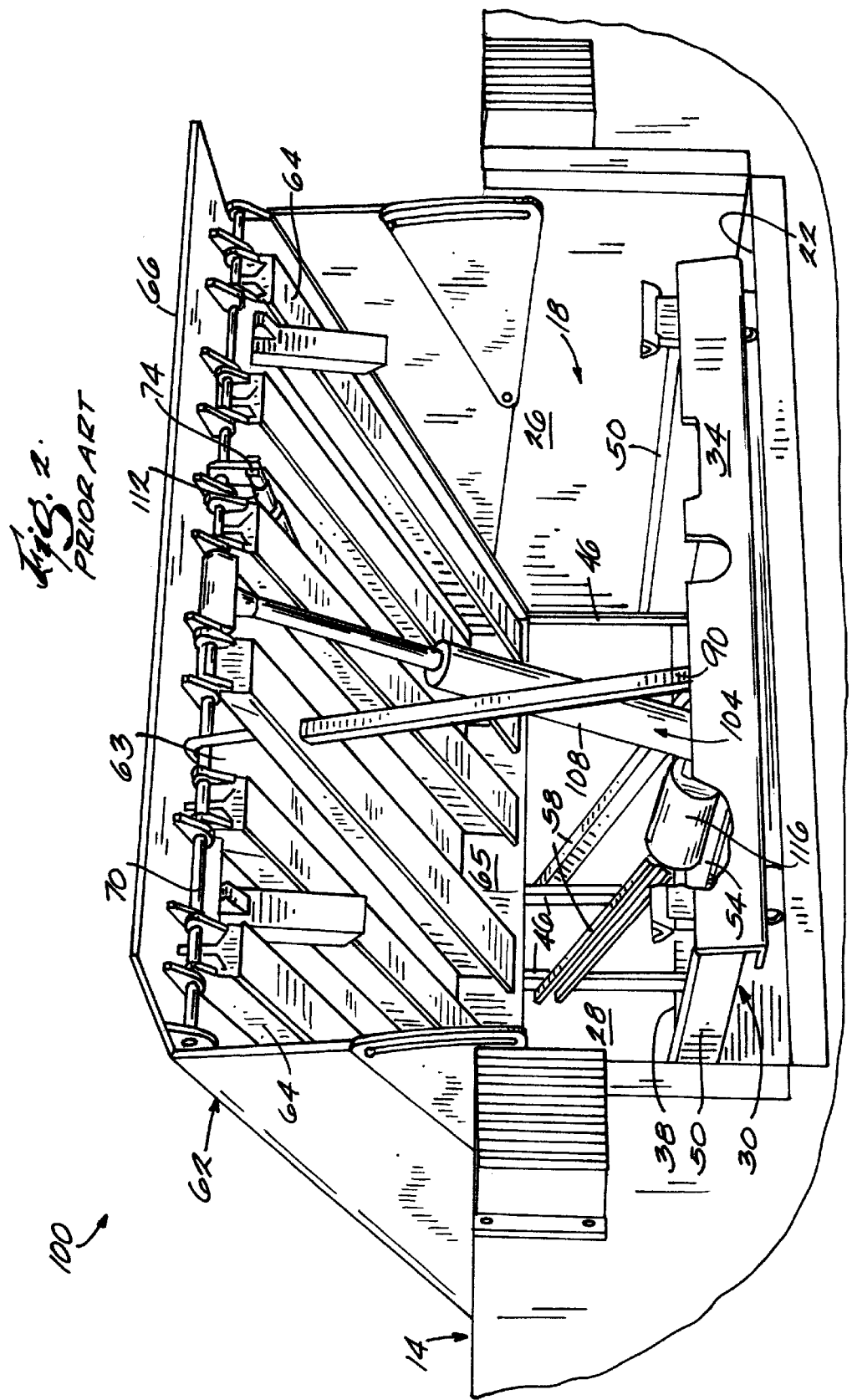
FIG. 2 is a perspective view of a prior art hydraulic dock leveler.

FIG. 2 illustrates a prior art hydraulic dock leveler 100. The hydraulic dock leveler 100 is representative of numerous prior art hydraulic dock levelers and it should be understood that the present invention is not limited to being used in conjunction with the specific hydraulic dock leveler 100 illustrated in FIG. 2. The hydraulic dock leveler 100 is similar to the mechanical dock leveler 10 shown in FIG. 1, and like parts are indicated with like reference numerals. Instead of the mechanical lifting mechanism 76, however, the hydraulic dock leveler 100 includes a hydraulic lifting mechanism 104. The hydraulic lifting mechanism 104 includes a main hydraulic cylinder 108 pivotally connected between the base plate 54 and the hinge pin 70. A second hydraulic cylinder 112 acts as the lip extension mechanism 74 and is mounted adjacent the underside of the ramp 62 to extend the lip 66 as the ramp 62 reaches the fully raised position. A control unit 116 including of a hydraulic pump, a control valve or valves, and a motor is operably connected to both hydraulic cylinders 108 and 112 to activate the cylinders 108 and 112 when the operator pushes a button or pulls on the pull chain (not shown). The control unit 116 can be mounted on the base plate 54 or in any other suitable location. Of course, various other lip extension mechanisms 74 could be used in place of the hydraulic cylinder 112.

Figure 3:
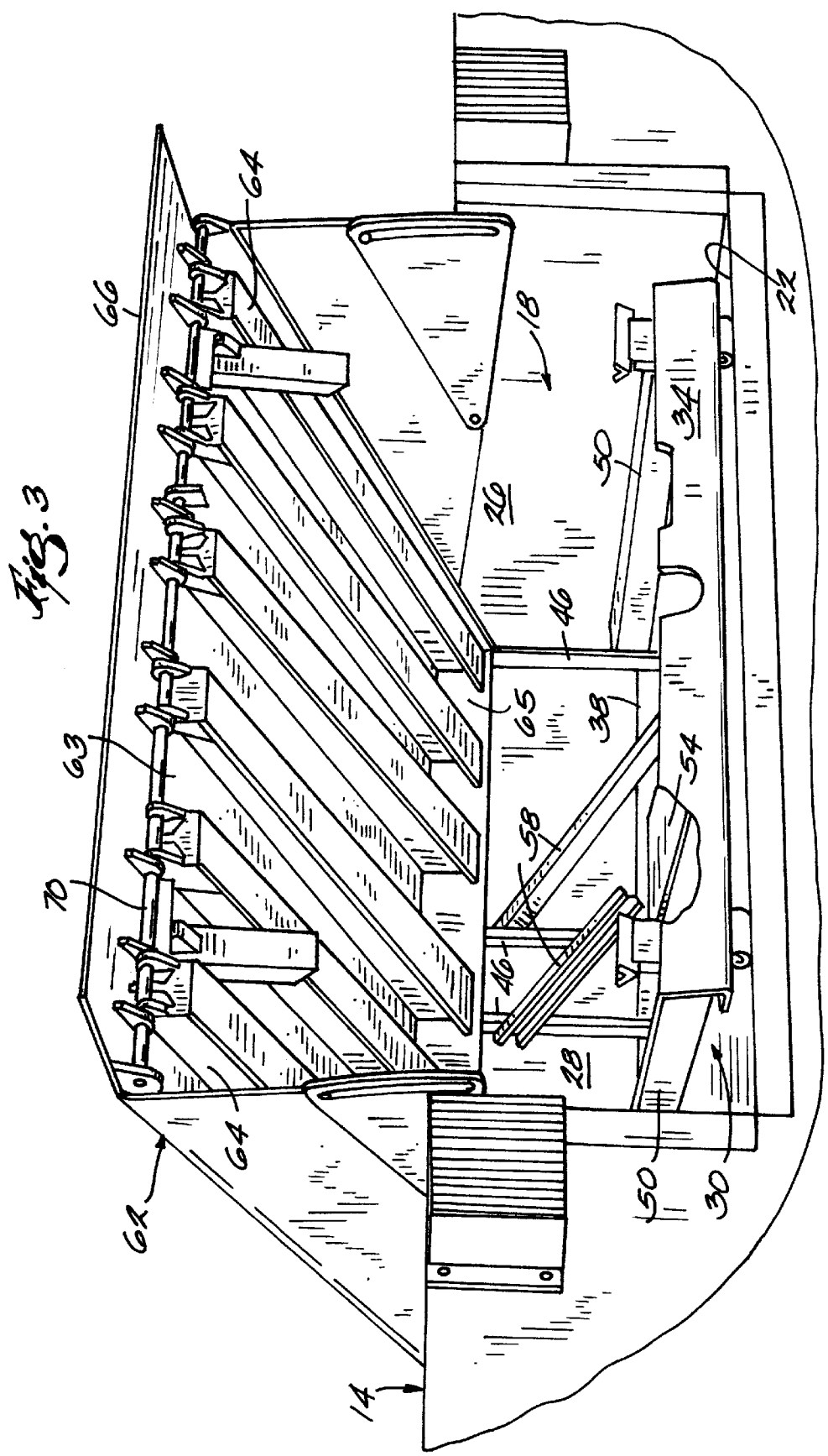
FIG. 3 is a perspective view of the dock levelers of FIGS. 1 and 2 shown with the respective mechanical and hydraulic lifting mechanisms removed.

According to the present invention, the prior art dock levelers 10 and 100 (collectively referred to as non-inflatable dock levelers) are converted to an inflatable bag dock leveler much like those disclosed in U.S. Pat. Nos. 5,802,651, 5,802,650, 5,651,155, 5,600,859, 5,522,108, 5,522,107, 5,500,968, 5,481,774, 5,475,888, 5,471,693, and 5,446,938, all of which are hereby incorporated by reference. In order to convert a prior art non-inflatable dock leveler to an inflatable bag dock leveler, most or all of the mechanical or hydraulic lifting mechanisms 76 and 104 must be removed. FIG. 3 illustrates what the dock levelers 10 and 100 look like after removing certain parts in preparation for converting the dock levelers 10 and 100 to inflatable bag dock levelers.

As seen in FIG. 3, the lifting mechanism 76 or 104 has been removed from within the frame 30. In the case of the dock leveler 10 of FIG. 1, this includes the cylinder 82, the spring 78, all other components (not shown) located within the cylinder 82, and the hold-down mechanism 86. The lip extension mechanism 74 and the maintenance strut 90 have also been removed from the dock leveler 10. In the case of the dock leveler 100 of FIG. 2, removal of the hydraulic lifting mechanism 104 includes removing the main hydraulic cylinder 108 and the control unit. The maintenance strut 90 and the second hydraulic cylinder 112, which is acting as the lip extension mechanism 74, are also removed from the dock leveler 100 in preparation for the conversion to an inflatable bag dock leveler.

Removal of the lip extension mechanism 74 and the maintenance strut 90 may not be necessary depending upon their specific designs, locations and methods of operation, however, in most cases removal will be desired. It may also be possible to reinstall and use the existing lip extension mechanism 74 and maintenance strut 90 after conversion. As seen in FIG. 3, the angled support members 58 remain for illustration purposes, but will also be removed as described below.

FIG. 4 illustrates an inflatable bag dock leveler conversion kit 120 that is used to convert a prior art non-inflatable dock leveler to an inflatable bag dock leveler. The illustrated conversion kit 120 preferably includes an inflatable member or bag assembly 124 having vertically superimposed upper and lower bags 128 and 132, respectively. The construction of the bag assembly 124 is illustrated and described in U.S. Pat. No. 5,446,938. The bags 128 and 132 are preferably formed of any satisfactory air-impervious material, such as fabric coated with a thermoplastic resin, and have contiguous horizontal surfaces joined together via an annular seal enclosing an opening providing communication between the bags 128 and 132. It should be appreciated that one or more bags could be used.

The conversion kit 120 also includes a bag support assembly 136, which includes three side-by-side sections 140, 142, and 144 (see FIG. 9). The sections 140, 142, and 144 include upper support plates 146, 148, and 150, respectively, which have downturned side flanges 152, 154; 156, 158; and 160, 162, respectively. The support plate 148 preferably includes a hole 166, the purpose of which will be described below. A pin 170 extends through aligned openings located adjacent the rearward ends of flanges 152-162, and an axle 174 extends through aligned openings located toward the forward ends of flanges 152-162. The pin 170 and the axle 174 function to secure the support sections 140, 142, and 144 together. A series of wheels 178 are mounted to the axle 174. An outer pair of wheels are located adjacent flanges 152 and 162, and an inner pair of wheels 178 are located one between sections 140 and 142 adjacent flanges 154 and 156, respectively, and the other between sections 142 and 144 adjacent flanges 158 and 160, respectively. It should be appreciated that one or more wheels 178 could be used.

The conversion kit 120 also includes a fan or blower device 182 (see FIG. 4) that can be mounted to the lower surface of one of the plates, preferably to plate 148 of central section 142. The construction of the fan device 182 is illustrated and described in U.S. Pat. No. 5,802,650. The fan device 182 is electrically operated, and includes a conventional cord engageable with an electrical outlet (not shown) for providing power to the fan device 182. An air pipe assembly 186, consisting of a fan outlet section 188, a flexible elbow 190, and a discharge section 192 capable of extending through the hole 166, is mountable between the fan device 182 and the interior of lower airbag 132. When assembled, as illustrated and described in U.S. Pat. No. 5,802,650, the fan outlet section 188 receives pressurized air from the fan device 182, which is then transferred through the elbow 190 and the discharge section 192 into the lower airbag 132 and subsequently into the upper airbag 128. A pushbutton control unit (not shown) can be conveniently located adjacent the loading dock 14 to operate the fan device 182.

FIG. 4a illustrates the mounting configuration for an alternative fan device 182a that can be used with the conversion kit 120. The fan device 182a is constructed and mounted such that the flexible elbow 192 can be eliminated. A modified discharge section 192a extends directly between the outlet of the fan device 182a and the interior of the lower airbag 132 when the fan device 182a is mounted to the underside of the bag support assembly 136.

While the fan devices 182 and 182a are described and shown as being mounted to the support assembly 136, it is understood that the fan devices 182 and 182a could be mounted in any other location, such as on the underside of the ramp 62. Alternatively, it is understood that air from a pressurized, regulated air source, such as compressed shop air, could be used in place of the fan devices 182 and 182a.

When assembled as illustrated and described in U.S. Pat. No. 5,802,650 and as shown in FIG. 6, the bag assembly 124, the bag support assembly 136, the fan device 182, and the air pipe assembly 186 together comprise a inflatable lifting assembly 196 that can be installed into and removed from the non-inflatable dock leveler as a unit, to facilitate installation, servicing, and/or replacement of such components. This arrangement is well-suited for use in the conversion kit 120 since it enables the bag assembly 124, the bag support assembly 136, the fan device 182, and the air pipe assembly 186 to be assembled independently from the other components of the conversion kit 120 and the non-inflatable dock leveler.

Referring to FIG. 4, the conversion kit 120 also includes a first support member in the form of a J-hook support 200 comprising an L-shaped base member 204 adapted to be secured to the ramp 62 of the non-inflatable dock leveler. Shims 208 can be used to assist in mounting the base member 204 to the ramp 62 as will be described below. Connected to the base member 204 are a plurality of spaced-apart depending J-hook bracket members 212. One or more bracket members 212 can be used. The bracket members 212 are preferably welded to the base member 204, but could also be connected via other suitable means, or could be integrally formed with the base member 204. Each bracket member 212 includes an upwardly extending lip 216 at its lower, forward end defining an upwardly facing slot. The upwardly facing slot is sized to receive and support the pin 170 of the bag support assembly 136. With this construction, the rearward end of the bag support assembly 136 is engageable with the brackets 212 via a downward movement of the rearward end of the bag support assembly 136 and is removable from engagement with an upward movement (see FIG. 6).

The conversion kit 120 further includes a second support member in the form of a roller support 220 adapted to be secured to the frame 30 of the non-inflatable dock leveler. As seen in FIGS. 4 and 9, the illustrated roller support 220 is a substantially planar member that is adapted to support the wheels 178 mounted on the front end of the bag support assembly 136. Depending on the configuration of the frame 30, support blocks 224 can be selectively positioned between the roller support 220 and the pit floor 22 to provide added support to the roller support 220. The support blocks 224 can be of any suitable construction and material, including the square metal tubing shown in the figures. Preferably, the support blocks 224 will be positioned directly below each of the wheels 178. The support blocks 224 can be separate pieces or can be integrally formed with the roller support 220. As will be described below, the roller support 220 can also have different configurations in order to accommodate a variety of frame constructions.

The conversion kit 120 also includes a pressure plate in the form of a bag shield 228 mountable to the undersides of the longitudinally extending beams 64 via fasteners 230. When assembled, the upper end of the upper bag 128 bears against the bag shield 228, providing a uniform engagement surface for the upper bag 128 and protecting the upper bag 128 from being damaged.

Also included in the conversion kit 120 is a lip extension mechanism 232 that can be mounted to the non-inflatable dock leveler, if needed, to replace the old lip extension mechanisms 74. The lip extension mechanism 232 can be any suitable mechanical, hydraulic or pneumatic mechanism. The lip extension mechanism 232 shown in FIGS. 4–7 is a mechanical lifting mechanism configured to actuate the extension of the lip 66 without any operator action. While shown to include the lip 66 in FIG. 4, it should be understood that the lip extension mechanism 232 can be, and usually is, used in conjunction with the existing lip 66 on the non-inflatable dock leveler. The features and operation of the lip extension mechanism 232 will be described in more detail below.

Installation of the conversion kit 120 into the frame 30 of the non-inflatable dock leveler shown in FIG. 3 will now be described. Referring to FIG. 6, the base plate 54 and angled support members 58 are removed from the non-inflatable dock leveler. Preferably, the angled support members 58 are cut off or otherwise removed from the vertical members 46. Detaching the angled support members 58 from the vertical members 46 should free the base plate 54 from the frame 30. Removal of the base plate 54 and angled support members 58 would not be required for prior art non-inflatable dock levelers that do not have such features.

Next, and in no particular order, the J-hook support 200, the roller support 220, the bag shield 228, and the lip extension mechanism 232 are mounted to the non-inflatable dock leveler. If needed, the shims 208 can be mounted to the underside of the ramp 62, and preferably to the undersides of the longitudinally extending beams 64 by welding. The base member 204 of the J-hook support 200 is then preferably welded to the shims 208. If the shims 208 are not required, the base member 204 can be welded directly to the beams 64. Alternatively, the J-hook support 200 could be mounted to the rear member 65 of the ramp 62. Other suitable fastening methods besides welding can also be used.

The roller support 220 is preferably welded to the side members 50 as shown in FIGS. 6–9. If the support blocks 224 are separate pieces, they can be welded to the underside of the roller support 220 prior to installing the roller support 220 or, alternatively, can be installed and secured underneath the roller support 220 after installation of the roller support 220. The support blocks 224 can also be secured to the pit floor 22 if desired. Multiple support blocks 224 can be stacked and/or shims (not shown) can be used to achieve the necessary height.

Figure 10:
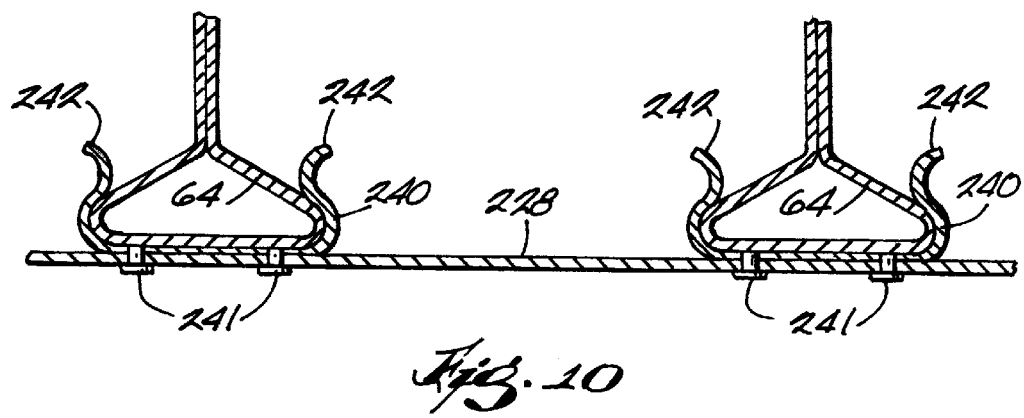
FIG. 10 is a partial section view showing a clip being used to mount a portion of the dock leveler conversion kit onto the dock leveler.

The bag shield 228 is preferably fastened to the undersides of the longitudinally extending beams 64. The fasteners 230 can be rivets 236 (see FIGS. 4, 7 and 9), clips 240 (see FIGS. 6 and 10), or any other suitable fasteners. As best seen in FIG. 10, the clips 240 can be fastened to the bag shield 228 using rivets 241 or other suitable fasteners. The clips 240 include ends 242 that are biased together in a spring-like fashion to hold the clips 240 and the bag shield 228 in place on the beams 64. While the beams 64 are illustrated to be lamda-type beams, the clips 240 could also be used on standard I-beams. Other fastening techniques, such as adhesive bonding or welding, can also be used to fasten the bag shield 228 to the ramp 62.

Portions of the lip extension mechanism 232, if needed, are also preferably coupled to the respective portions of the non-inflatable dock leveler, namely portions of the ramp 62 and the lip 66. Some of the final connections for the lip extension mechanism 232 will be made after the installation of the inflatable lifting assembly 196.

Next, and as seen in FIG. 6, the inflatable lifting assembly 196 is assembled and/or prepared for installation into the non-inflatable dock leveler. Because the inflatable lifting assembly 196 can be treated as an independent component, assembly and preparation of the inflatable lifting assembly may occur off site, on site, or in some combination of both. With the inflatable lifting assembly 196 assembled and prepared, it is coupled to the non-inflatable dock leveler (see FIG. 7) in the following manner. First the inflatable lifting assembly 196 is moved into position inside the frame 30 and the rear end of the bag support assembly 136 is lifted into position such that the pin 170 can be received in the upwardly facing slots of the bracket members 212. A lifting tool (not shown) like the one illustrated and described in U.S. Pat. No. 5,802,650 can be used to aid in the installation. Once the pin 170 is supported by the bracket members 212, the wheels 178 on the front end of the bag support assembly 136 should ride on the roller support 220. The bag support assembly 136 is therefore supported within the frame 30 by the J-hook support 200 and the roller support 220 such that the rearward end of bag support assembly 136 is elevated relative to the forward end. The electrical connections between the fan device 182, the power supply, and the pushbutton control can then be made. Any final connections for the lip extension mechanism 232 can also be made.

The existing maintenance strut 90 can be reattached if it will operate without obstructing or being obstructed by any components of the conversion kit 120. Alternatively, the existing maintenance strut 90 can be relocated or a new telescoping maintenance strut 242 (see FIG. 7) or a new maintenance strut kit (not shown) can be installed.

FIG. 7 shows the completed conversion from a non-inflatable dock leveler to an inflatable bag dock leveler, generally designated as 244. The conversion results in an inflatable bag dock leveler 244 that provides the advantages associated with new inflatable bag dock levelers without the costs associated with completely removing an existing non-inflatable dock leveler and replacing it with a new inflatable bag dock leveler.

Figure 11:
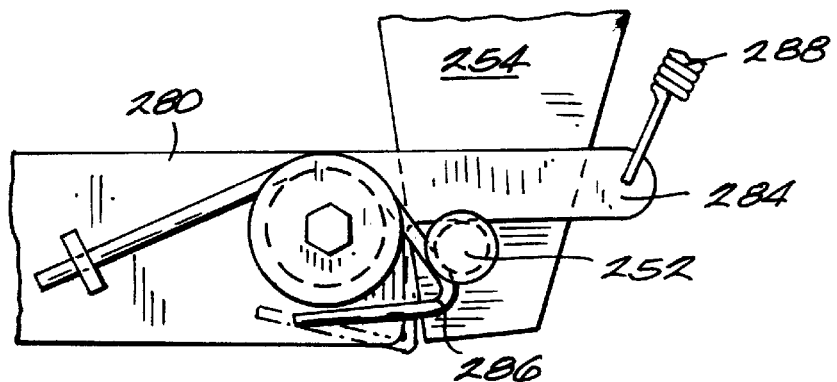
FIG. 11 is an enlarged side view showing a portion of the lip extension mechanism of FIG. 4.

The operation of the inflatable bag dock leveler 244 is substantially the same as the operation of the inflatable bag dock levelers shown and described in the incorporated patents. Pushbutton controls allow the operator to raise and lower the ramp 62 as needed. The lip extension mechanism 132 works in conjunction with the inflatable lifting assembly 196 to extend the lip 66 as the ramp 62 is raised. More specifically, the lip extension mechanism 132 (see FIGS. 4–7) includes a bellcrank link 248 pivotable about a pivot pin 252. The pivot pin 252 is supported by a support bracket 254 that is connected to the ramp 62. A chain 256 (see FIGS. 4, 5, and 7) is connected at one end to the bellcrank link 248 via a connector link 260. The other end of the chain 256 is connected to a first tension spring 264 that is connected to the front lower member 34 via a connector link 268. An extension link 272 is pivotally connected between the bellcrank link 248 and a lip lug 276, which is fixed to the underside of the lip 66. A securing link 280 is also pivotally connected to the lip lug 276 and includes a notched end 284 that is engageable with the pivot pin 252 to secure the lip 66 in the extended position as will be described below. A latch spring 286 is mounted on the notched end 284 to engage the pivot pin 252 (see FIGS. 5 and 11). As shown in FIG. 11, the latch spring 286 is movable between a first position, wherein the latch spring 286 engages the pivot pin 252, to a second position (shown in phantom in FIG. 11), wherein the latch spring 286 becomes disengaged from the pivot pin 252. If a vehicle were to back into an extended lip 66, the latch spring 286 will move from the first position to the second position, thereby allowing the lip 66 to yield to the pendant position.

An upwardly biasing spring 288 is coupled between the notched end 284 and the ramp 62 to bias the notched end 284 upwardly and out of engagement with the pivot pin 252. A downwardly biasing spring 292 is coupled between the securing link 280 and the chain 256 to bias the notched end 284 downwardly and into engagement with the pivot pin 252 when the ramp 62 is fully raised. A chain biasing spring 296 (see FIG. 7) is preferably coupled between the chain 256 and any suitable portion of the inflatable bag dock leveler 244 (e.g., the bag support assembly 136) to bias the chain 256 away from the front lower member 34 and out of the way as the ramp 62 is lowered.

As the ramp 62 is raised, tension in the chain 256 pivots the bellcrank link 248 downwardly which causes the extension link 272 to move forwardly, thereby moving the lip lug 276 and extending the lip 66. The tension in the downwardly biasing spring 292 increases to overcome the tension in the upwardly biasing spring 288 and force the latch spring 286 on the notched end 284 to engage the pivot pin 252, thereby securing the lip 66 in the extended position. The latch spring 286 is maintained in engagement with the pivot pin 252 by the weight of the extended lip 66.

As the ramp 62 is lowered into engagement with a vehicle, the securing link 280 and the latch spring 286 support the weight of the lip 66. When the lip 66 engages the vehicle, the vehicle bears the weight of the lip 66, allowing the latch spring 286 on the securing link 280 to become disengageable from the pivot pin 252. The upwardly biasing spring 288 biases the notched end 284 out of engagement with the pivot pin 252. When the ramp 62 is raised to allow the vehicle to leave the dock 14, the securing link 280 slides on top of the pivot pin 252 and the lip 66 returns to its pendant position.

FIG. 12 illustrates an alternative configuration for a roller support 300. The roller support 300 can be used for non-inflatable dock levelers that have the spaced-apart side members 50 of the frame 30 closer together. As seen in FIG. 12, the side member 50 is inboard of the outer wheel 178. The roller support 300 includes two stepped portions 304 (only one is shown) that accommodate the inboard location of the side members 50. As with the roller support 220, support blocks 224 can be used between the roller support 300 and the pit floor 22. Other configurations of roller supports can also be used depending on the particular configuration of the frame 30.

It should be noted that the present invention could be practiced without the roller supports 220 and 300 if desired. In this case, the wheels 178 could be supported for rolling movement directly on the pit floor 22. The condition of the pit floor 22, the configuration of the frame 30, and the desired range of ramp movement will dictate whether the roller supports 220 or 300 are needed.

Various features of the invention are set forth in the following claims.

What is claimed is:

1. A method of converting a non-inflatable dock leveler having a lifting mechanism to an inflatable bag dock leveler, the method comprising:
   removing the lifting mechanism from the non-inflatable dock leveler; and
   coupling an inflatable lifting assembly to the non-inflatable dock leveler.

2. The method of claim 1, wherein the lifting mechanism includes a spring, and the removing step includes removing the spring.

3. The method of claim 1, wherein the lifting mechanism includes a hydraulic cylinder, and the removing step includes removing the hydraulic cylinder.

4. The method of claim 1, wherein the inflatable lifting assembly includes a bag support assembly, an inflatable bag supported on the bag support assembly, and a blower device operatively coupled to the inflatable bag, and wherein the method further includes connecting the inflatable bag to the bag support assembly and coupling the blower device to the inflatable bag.

5. The method of claim 1, further including connecting a support member to the non-inflatable dock leveler to support a portion of the inflatable lifting assembly.

6. The method of claim 5, wherein the support member includes a base member and a plurality of support hooks coupled to the base member in spaced-apart relation, and wherein the connecting step includes securing the base member to the non-inflatable dock leveler.

7. The method of claim 6, wherein the non-inflatable dock leveler includes a frame and a ramp pivotally coupled to the frame, and wherein the securing step includes securing the base member to the ramp.

8. The method of claim 1, wherein the inflatable lifting assembly includes rollers, and wherein the method further includes connecting a roller support member to the non-inflatable dock leveler to support the rollers.

9. The method of claim 1, wherein the inflatable lifting assembly includes an inflatable bag, wherein the dock leveler includes a ramp having a bottom surface, and wherein the method further includes coupling a bag shield to the bottom surface.

10. The method of claim 9, wherein the bag shield is riveted to the ramp.

11. The method of claim 9, wherein the bag shield is clipped to the ramp.

12. The method of claim 1, wherein the non-inflatable dock leveler includes a frame and a ramp pivotally coupled to the frame, wherein the frame includes at least one angled support member, and wherein the method further includes removing the angled support member.

13. The method of claim 1, wherein the non-inflatable dock leveler includes a ramp and a lip extension pivotally coupled to the ramp, and wherein the method further includes coupling a lip extension member to the lip extension.

14. A method of coupling a dock leveler conversion kit to a dock leveler positioned in a pit having a floor, the dock leveler having a frame, a ramp with a rear edge movably coupled to the frame at a pivot point, and a lifting mechanism coupled to the ramp, the method comprising:

removing the lifting mechanism from the dock leveler;

coupling a first support member to an underside of the ramp; and positioning an inflatable lifting assembly within the frame and underneath the ramp, the inflatable lifting assembly being at least partially supported by the first support member.

15. The method of claim 14, wherein the lifting mechanism includes a spring, and the removing step includes removing the spring.

16. The method of claim 14, wherein the lifting mechanism includes a hydraulic cylinder, and the removing step includes removing the hydraulic cylinder.

17. The method of claim 14, wherein the first support member is spaced from the pivot point when coupled to the ramp.

18. The method of claim 14, wherein the inflatable lifting assembly includes a bag support assembly, an inflatable bag supported on the bag support assembly, and a blower device operatively coupled to the inflatable bag, and wherein the method further includes connecting the inflatable bag to the bag support assembly and coupling the blower device to the inflatable bag.

19. The method of claim 14, wherein the first support member includes a base member and a plurality of support hooks coupled to the base member in spaced-apart relation, and wherein the step of coupling the first support member includes securing the base member to the ramp.

20. The method of claim 14, wherein the inflatable lifting assembly includes an inflatable bag, and wherein the method further includes coupling a bag shield to the underside of the ramp.

21. The method of claim 20, wherein the bag shield is riveted to the underside of the ramp.

22. The method of claim 20, wherein the bag shield is clipped to the underside of the ramp.

23. The method of claim 14, further including coupling a second support member to at least one of the pit floor and the frame such that the inflatable lifting assembly is at least partially supported by both the first and second support members.

24. The method of claim 23, wherein at least a portion of the second support member is positioned between the frame and the ramp.

25. The method of claim 14, wherein the frame includes at least one angled support member, and wherein the method further includes removing the angled support member.

26. The method of claim 14, wherein the non-inflatable dock leveler includes a lip extension pivotally coupled to a front edge of the ramp, and wherein the method further includes coupling a lip extension member to the lip extension.

27. A dock leveler conversion kit for converting a non-inflatable dock leveler having a lifting mechanism to a dock leveler operated by an inflatable member, the conversion kit comprising:

an inflatable lifting assembly; and a first support member for supporting a first portion of the inflatable lifting assembly when the first support member and the inflatable lifting assembly are coupled to the dock leveler after the lifting mechanism has been removed.

28. The dock leveler conversion kit of claim 27, wherein the inflatable lifting assembly includes a bag support assembly, an inflatable bag supported on the bag support assembly, and a blower device operatively coupled to the inflatable bag.

29. The dock leveler conversion kit of claim 27, wherein the first support member includes:

a base member adapted to be secured to the dock leveler; and a plurality of support hooks coupled to the base member.

30. The dock leveler conversion kit of claim 27, further including a second support member for supporting a second portion of the inflatable lifting assembly when the second support member and the inflatable lifting assembly are coupled to the dock leveler after the lifting mechanism has been removed.

31. The dock leveler conversion kit of claim 30, wherein the second support member is a roller support member.

32. The dock leveler conversion kit of claim 27, further including a lip extension mechanism adapted to be coupled to the dock leveler.

* * * * *